United States Patent
Iwata

(10) Patent No.: US 11,099,104 B2
(45) Date of Patent: Aug. 24, 2021

(54) METHOD OF DETERMINING PROOF STRESS, AND VEHICLE BODY STRUCTURE

(71) Applicant: TOYOTA JIDOSHA KABUSHIKI KAISHA, Toyota (JP)

(72) Inventor: Yorikazu Iwata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 16/220,195

(22) Filed: Dec. 14, 2018

(65) Prior Publication Data

US 2019/0219485 A1 Jul. 18, 2019

(30) Foreign Application Priority Data

Jan. 16, 2018 (JP) .............................. JP2018-004810

(51) Int. Cl.

| | |
|---|---|
| *G01M 17/007* | (2006.01) |
| *G01L 5/00* | (2006.01) |
| *G01L 1/06* | (2006.01) |
| *B60R 19/02* | (2006.01) |
| *B60R 19/18* | (2006.01) |
| *G01N 3/30* | (2006.01) |
| *B60R 19/34* | (2006.01) |

(52) U.S. Cl.
CPC ......... *G01M 17/0078* (2013.01); *B60R 19/02* (2013.01); *B60R 19/34* (2013.01); *G01L 1/06* (2013.01); *G01L 5/0052* (2013.01); *G01N 3/30* (2013.01); *B60R 2019/1806* (2013.01)

(58) Field of Classification Search
CPC ........... B60R 2019/1806; B60R 19/02; G01M 17/0078; G01L 5/0052; G01L 1/06
See application file for complete search history.

(56) References Cited

U.S. PATENT DOCUMENTS

2004/0135382 A1\* 7/2004 Sakuma .................. B60R 19/34
293/102

FOREIGN PATENT DOCUMENTS

| JP | H10-203411 A | 8/1998 |
|---|---|---|
| JP | 2006-232030 A | 9/2006 |

\* cited by examiner

*Primary Examiner* — Paul M. West
(74) *Attorney, Agent, or Firm* — Oliff PLC

(57) ABSTRACT

A method of determining proof stress includes: calculating a needed load needed to completely crush a deformable impact absorption body of a barrier in a range that comes into contact with a rear bumper reinforcement, based on a load needed to completely crush the entire front surface of the impact absorption body, an area of the entire front surface of the impact absorption body, and an area of the front surface of the impact absorption body, which comes into contact with the rear bumper reinforcement; calculating a maximum bending moment acting on the rear bumper reinforcement in a case where the needed load is input; and determining proof stress of a pair of side members to be equal to or greater than the needed load and determining proof stress of the rear bumper reinforcement to be equal to or greater than the maximum bending moment.

5 Claims, 5 Drawing Sheets

ND OF DETERMINING PROOF STRESS, AND VEHICLE BODY STRUCTURE

METHOD OF DETERMINING PROOF STRESS, AND VEHICLE BODY STRUCTURE

INCORPORATION BY REFERENCE

The disclosure of Japanese Patent Application No. 2018-004810 filed on Jan. 16, 2018 including the specification, drawings and abstract is incorporated herein by reference in its entirety.

BACKGROUND

1. Technical Field

The present disclosure relates to a method of determining proof stress, and a vehicle body structure.

2. Description of Related Art

In the related art, a vehicle body rear portion structure that includes a pair of rear side members and a rear bumper reinforcement is known (refer to, for example, Japanese Unexamined Patent Application Publication No. 2006-232030 (JP 2006-232030 A)). The rear side members are formed so as to extend in a front-rear direction of a vehicle and are provided as a pair of right and left rear side members, at both end portions in a vehicle width direction. The rear bumper reinforcement is provided at rear end portions of the rear side members and is formed so as to extend in the vehicle width direction.

SUMMARY

Here, in a case where an offset-collision of a moving deformable barrier (MDB) imitating a vehicle with the rear surface of the vehicle occurs, it is desirable that the amount of deformation of a deformable honeycomb body (impact absorption body) of the MDB becomes large. When the amount of deformation of the honeycomb body of the MDB becomes large, the amount of collision energy that is absorbed by the honeycomb body becomes large, and therefore, it is possible to suppress deformation of a cabin. However, in the related art, proof stress of the rear side members and the rear bumper reinforcement is not taken into account from the viewpoint as described above, and thus there is room for improvement.

The present disclosure provides a method of determining proof stress and a vehicle body structure, in which it is possible to suppress deformation of a cabin at the time of an offset collision.

A first aspect of the present disclosure relates to a method of determining proof stress. The method of determining proof stress is a method of determining proof stress of a pair of side members and a bumper reinforcement in a vehicle body structure that includes the side members and the bumper reinforcement. The method includes: calculating a needed load needed to completely crush a deformable impact absorption body of a barrier in a range that comes into contact with the bumper reinforcement at the time of an offset collision, based on a load needed to completely crush an entire front surface of the deformable impact absorption body in a case where an offset-collision of the barrier including the deformable impact absorption body with the vehicle body structure occurs, an area of the entire front surface of the impact absorption body, and an area of the front surface of the impact absorption body, which comes into contact with the bumper reinforcement at the time of the offset collision; calculating a maximum bending moment acting on the bumper reinforcement in a case where the needed load is input at the time of the offset collision, based on the needed load, a distance between the side members, and a range in which the impact absorption body comes into contact with the bumper reinforcement at the time of the offset collision between the side members; and determining the proof stress of the side members to be equal to or greater than the needed load and determining the proof stress of the bumper reinforcement to be equal to or greater than the maximum bending moment.

According to the first aspect of the present disclosure, at the time of the offset collision, it is possible to restrain the side members and the bumper reinforcement from being deformed before the impact absorption body in the range that comes into contact with the bumper reinforcement is completely crushed. In this way, it is possible to increase the amount of collision energy that is absorbed by the impact absorption body at the time of the offset collision, and therefore, deformation of a cabin can be suppressed.

In the method according to the first aspect of the present disclosure, the proof stress of the side members may be determined as the needed load, and the proof stress of the bumper reinforcement may be determined as the maximum bending moment.

According to the aspect of the present disclosure, it is possible to reduce the mass of the side member and the mass of the bumper reinforcement while increasing the amount of collision energy that is absorbed by the impact absorption body at the time of the offset collision.

In the method according to the first aspect of the present disclosure, the side member may be a rear side member, and the bumper reinforcement may be a rear bumper reinforcement.

According to the aspect of the present disclosure, it is possible to suppress the deformation of the cabin at the time of an offset collision with a vehicle rear surface.

In the method according to the first aspect of the present disclosure, the needed load may be calculated in consideration of a safety factor.

According to the aspect of the present disclosure, even though variation occurs in the area of the impact absorption body that comes into contact with the bumper reinforcement at the time of the offset collision, it is possible to restrain the side members from being deformed before the impact absorption body is completely crushed.

In the method according to the first aspect of the present disclosure, the maximum bending moment may be calculated in consideration of a safety factor.

According to the aspect of the present disclosure, even though variation occurs in the needed load at the time of the offset collision or in the range in which the impact absorption body comes into contact with the bumper reinforcement at the time of the offset collision, it is possible to restrain the bumper reinforcement from being deformed before the impact absorption body is completely crushed.

A second aspect of the present disclosure relates to a vehicle body structure. The vehicle body structure includes a pair of side members and a bumper reinforcement. The side members are configured such that proof stress of the side members becomes equal to or greater than a needed load needed to completely crush a deformable impact absorption body of a barrier in a range that comes into contact with the bumper reinforcement in a case where an offset-collision of the barrier including the deformable impact absorption body with the vehicle body structure occurs. The bumper reinforcement is configured such that proof stress of the bumper reinforcement becomes equal to or greater than a maximum bending moment acting on the bumper reinforcement in a case where the needed load is input at the time of an offset collision. The needed load is a value based on a load needed to completely crush an entire front surface of the impact absorption body, an area of the entire front surface of the impact absorption body, and an area of the front surface of the impact absorption body, which comes into contact with the bumper reinforcement at the time of the offset collision. The maximum bending moment is a value based on the needed load, a distance between the side members, and a range in which the impact absorption body comes into contact with the bumper reinforcement at the time of the offset collision between the side members.

According to the second aspect of the present disclosure, at the time of the offset collision, it is possible to restrain the side members and the bumper reinforcement from being deformed before the impact absorption body in the range that comes into contact with the bumper reinforcement is completely crushed. In this way, it is possible to increase the amount of collision energy that is absorbed by the impact absorption body at the time of the offset collision, and therefore, the deformation of the cabin can be suppressed.

In the vehicle body structure according to the second aspect of the present disclosure, the proof stress of the side members may be the needed load, and the proof stress of the bumper reinforcement may be the maximum bending moment.

According to the aspect of the present disclosure, it is possible to reduce the mass of the side member and the mass of the bumper reinforcement while increasing the amount of collision energy that is absorbed by the impact absorption body at the time of the offset collision.

In the vehicle body structure according to the second aspect of the present disclosure, the side member may be a rear side member, and the bumper reinforcement may be a rear bumper reinforcement.

According to the aspect of the present disclosure, it is possible to suppress the deformation of the cabin at the time of an offset collision with a vehicle rear surface.

In the vehicle body structure according to the second aspect of the present disclosure, the needed load may be a value considering a safety factor.

According to the aspect of the present disclosure, even though variation occurs in the area of the impact absorption body to be brought into contact with the bumper reinforcement at the time of the offset collision, it is possible to restrain the side members from being deformed before the impact absorption body is completely crushed.

In the vehicle body structure according to the second aspect of the present disclosure, the maximum bending moment may be a value considering a safety factor.

According to the aspect of the present disclosure, even though variation occurs in the needed load at the time of the offset collision or in the range in which the impact absorption body comes into contact with the bumper reinforcement at the time of the offset collision, it is possible to restrain the bumper reinforcement from being deformed before the impact absorption body is completely crushed.

With the method of determining proof stress and the vehicle body structure according to the first aspect and the second aspect of the present disclosure, it is possible to suppress deformation of a cabin at the time of an offset collision.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described based on the drawings.

First, a vehicle body rear portion structure 50 according to an embodiment of the present disclosure will be described with reference to FIG. 1.

Figure 1:
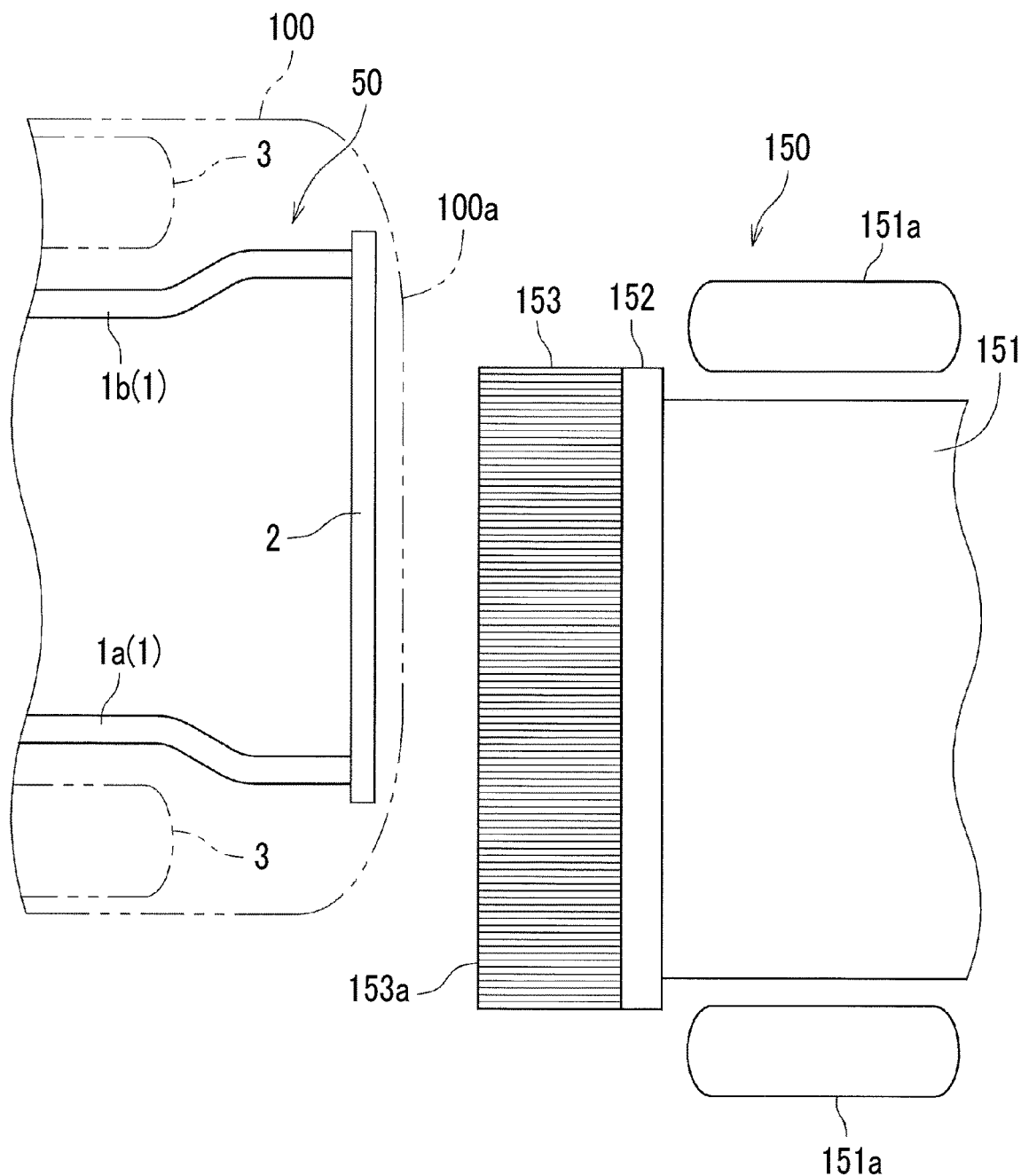
FIG. 1 is a schematic diagram showing a vehicle body rear portion structure according to an embodiment and a moving deformable barrier (MDB)

The vehicle body rear portion structure 50 is provided on a vehicle rear side (X2 direction side) of a vehicle 100, as shown in FIG. 1. The vehicle 100 has a cabin (not shown) provided on a vehicle front side (X1 direction side) with respect to the vehicle body rear portion structure 50. The vehicle body rear portion structure 50 includes a pair of rear side members 1 and a rear bumper reinforcement 2 connecting the rear side members 1. The vehicle body rear portion structure 50 is an example of a "vehicle body structure". The rear side member 1 is an example of a "side member", and the rear bumper reinforcement 2 is an example of a "bumper reinforcement".

The rear side members 1 are formed so as to extend in a front-rear direction (X1 and X2 directions) of the vehicle and are provided as a pair of right and left rear side members, at both end portions in a vehicle width direction (Y1 and Y2 directions). A rear wheel 3 is disposed outside each of the rear side members 1 in the vehicle width direction. The rear bumper reinforcement 2 is provided at rear end portions of the rear side members 1 and formed so as to extend in the vehicle width direction. Although a rear bumper cover or the like is provided on the vehicle rear side of the rear bumper reinforcement 2, illustration thereof is omitted for simplification.

Here, the vehicle body rear portion structure 50 is configured so as to be able to completely crush a deformable honeycomb body 153 of a moving deformable barrier (MDB) 150 imitating a vehicle, in a case where an offset-collision of the MDB 150 with a vehicle rear surface 100a occurs. Completely crushing the honeycomb body 153 refers to completely compressing the honeycomb body 153 to the bottom thereof. In this way, the amount of collision energy that is absorbed by the honeycomb body 153 becomes large, and thus it is possible to suppress deformation of the cabin.

The MDB 150 is provided with a movable truck 151 having wheels 151a, a rigid wall portion 152 provided at a front end of the truck 151, and the honeycomb body 153 provided on the front surface of the rigid wall portion 152. The honeycomb body 153 is made of, for example, an aluminum alloy and configured to be deformable. That is, the honeycomb body 153 has an impact absorption property. A front surface 153a (refer to FIG. 3) of the honeycomb body 153 is formed, for example, in a rectangular shape when viewed from the front. The MDB 150 is an example of a "barrier", and the honeycomb body 153 is an example of an "impact absorption body".

Since the honeycomb body 153 is completely crushed at the time of the offset collision of the MDB 150 with the vehicle rear surface 100a, the rear side members 1 and the rear bumper reinforcement 2 are configured not to be deformed (damaged) before the honeycomb body 153 is completely crushed. Specifically, proof stress PSs of the rear side members 1 and proof stress PSb of the rear bumper reinforcement 2 are determined by the following proof stress determination method. The proof stress PSs of the rear side members 1 is a total value of the proof stress of a rear side member 1a that is disposed on a first side (Y1 direction side) in the vehicle width direction and the proof stress of a rear side member 1b that is disposed on a second side (Y2 direction side) in the vehicle width direction.

Method of Determining Proof Stress

Next, a method of determining proof stress of the vehicle body rear portion structure 50 according to this embodiment will be described with reference to FIG. 2 to FIG. 4. The method of determining proof stress is performed in a design stage of the vehicle 100. In an offset collision that will be described later, the overlapping amount of the MDB 150 with respect to the vehicle rear surface 100a is set to, for example, 70%. That is, in the offset collision, the MDB 150 comes into contact with the range from a first end portion in the vehicle width direction of the vehicle rear surface 100a to a position corresponding to 70%, and the MDB 150 does not come into contact with the range from a second end portion in the vehicle width direction of the vehicle rear surface 100a to a position corresponding to 30%.

Figure 2:
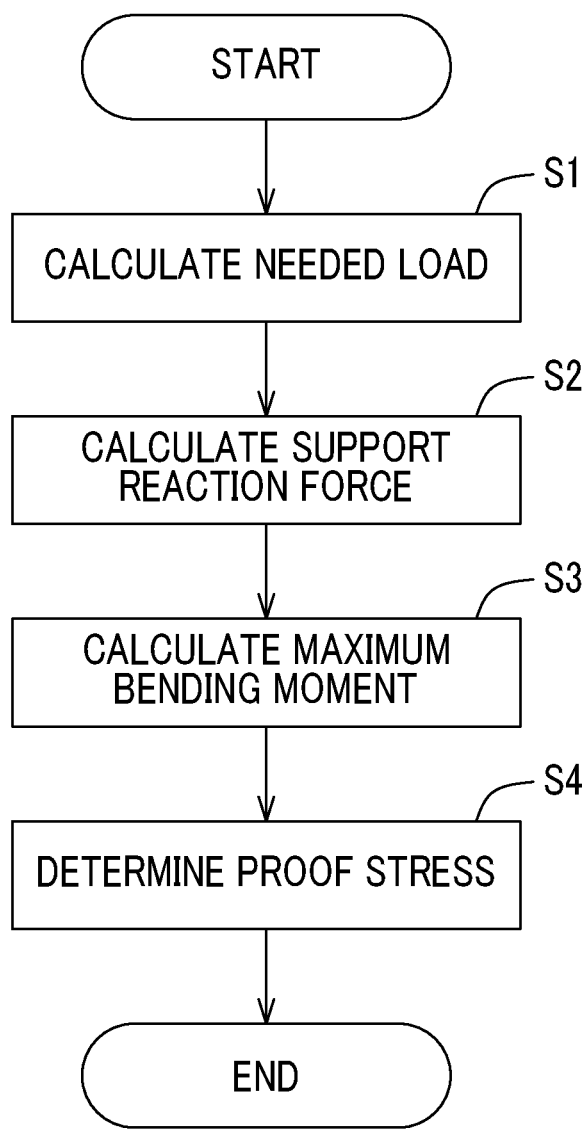
FIG. 2 is a flowchart for describing a method of determining proof stress of the vehicle body rear portion structure according to the embodiment.

First, in step S1 of FIG. 2, a needed load Pd needed to completely crush the honeycomb body 153 at the position corresponding to the rear bumper reinforcement 2 at the time of the offset collision is calculated. That is, at the time of the offset collision, the rear bumper reinforcement 2 is brought into contact with a part of the front surface 153a of the honeycomb body 153. For this reason, a load that is generated when the honeycomb body 153 at the corresponding position is completely crushed by the rear side member 1 supporting the rear bumper reinforcement 2 is calculated.

Figure 3:
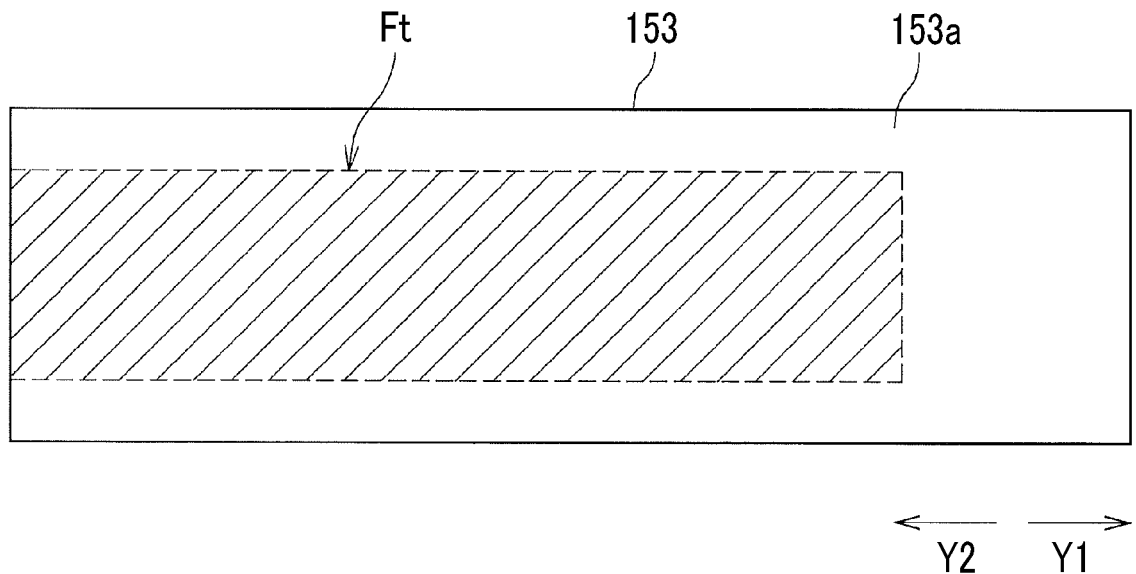
FIG. 3 is a diagram for describing a method of calculating a needed load and is a diagram showing a honeycomb body of the MDB as viewed from the front.
Figure 4:
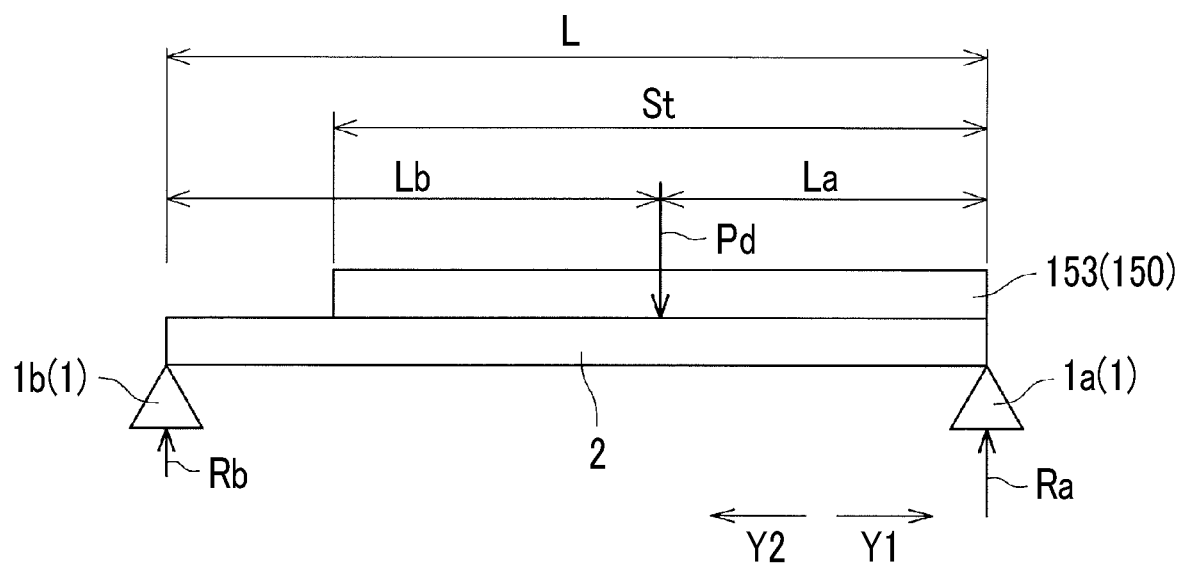
FIG. 4 is a diagram for describing a method of calculating a maximum bending moment and is a load diagram in which a rear bumper reinforcement is regarded as a simple beam in which both ends are supported by rear side members.

Specifically, at the time of the offset collision, as shown in FIG. 3, the rear bumper reinforcement 2 is brought into contact with a region Ft of a part of the front surface 153a of the honeycomb body 153. The needed load Pd is a load needed to completely crush the region Ft of the honeycomb body 153 by the rear side members 1 at the time of the offset collision and is calculated by the following expression (1).

$$Pd = Pw \times (At/Aw) \qquad (1)$$

In the expression (1), Pw is a load needed to completely crush the entire honeycomb body 153, and Aw is the entire area of the front surface 153a of the honeycomb body 153. At is the area of the region Ft and is the area of the front surface 153a of the honeycomb body 153, which is brought into contact with the rear bumper reinforcement 2 at the time of the offset collision. That is, At is the area of the front surface 153a of the honeycomb body 153, which is deformed by the rear bumper reinforcement 2 at the time of the offset collision.

That is, the needed load Pd is calculated based on the load Pw needed to completely crush the entire honeycomb body 153, the entire area Aw of the front surface 153a of the honeycomb body 153, and the area At of the front surface 153a of the honeycomb body 153, which is brought into contact with the rear bumper reinforcement 2 at the time of the offset collision. At the time of the offset collision, the front surface 153a of the honeycomb body 153 is brought into contact with the rear bumper reinforcement 2 through a rear bumper cover (not shown) or the like. As the load Pw, for example, the value measured in a compression test on the entire surface, which has been performed in advance, is set. As the area At, for example, the value measured in an offset collision test performed in advance is set.

Next, in step S2 of FIG. 2, a support reaction force of the rear side member 1 supporting the rear bumper reinforcement 2 in a case where the needed load Pd is input at the time of the offset collision is calculated. At the time of the offset collision, as shown in FIG. 4, the honeycomb body 153 is brought into contact with the rear bumper reinforcement 2 at a predetermined range St between the rear side members 1. The predetermined range St is disposed on the first side (the Y1 direction side) in the vehicle width direction between the rear side members 1. That is, the first side in the vehicle width direction is the collision side, the rear side member 1a is disposed on the collision side, the second side (the Y2 direction side) in the vehicle width direction is the side opposite to the collision side, and the rear side member 1b is disposed on the opposite side.

Here, when the needed load Pd that is input from the honeycomb body 153 to the rear bumper reinforcement 2 is set to be a concentrated load, a load position where the concentrated load is input can be calculated based on the predetermined range St. Specifically, a distance La from the rear side member 1a on the first side to the load position is ½ of the length of the predetermined range St. Then, a support reaction force Ra of the rear side member 1a on the first side and a support reaction force Rb of the rear side member 1b on the second side are respectively calculated by the following expressions (2) and (3).

$$Ra = Pd \times (Lb/L) \qquad (2)$$

$$Rb = Pd \times (La/L) \qquad (3)$$

In the expressions (2) and (3), Pd is a load that is input from the honeycomb body 153 to the rear bumper reinforcement 2, and is the needed load calculated by the expression (1). L is a distance between the rear side members 1. La in the expression (3) is the distance from the rear side member 1a on the first side to the load position and is calculated based on the predetermined range St of the rear bumper reinforcement 2, with which the honeycomb body 153 is brought into contact. As the predetermined range St, for example, the value measured by an offset collision test performed in advance is set. Lb in the expression (2) is the distance from the rear side member 1b on the second side to the load position and is calculated based on the distances L and La.

Next, in step S3 of FIG. 2, a maximum bending moment M that acts on the rear bumper reinforcement 2 in a case where the needed load Pd is input at the time of the offset collision is calculated. The maximum bending moment M is the maximum value of a bending moment that is generated in the rear bumper reinforcement 2 in a case where the needed load Pd is input to the rear bumper reinforcement 2, and is calculated by the following expression (4). The maximum bending moment M is generated at the load position of the rear bumper reinforcement 2, to which the concentrated load is input.

$$M = Ra \times La = Rb \times Lb = Pd \times (La \times Lb/L) \qquad (4)$$

That is, the maximum bending moment M is calculated based on the needed load Pd, the distance L between the rear side members 1, and the predetermined range St in which the honeycomb body 153 comes into contact with the rear bumper reinforcement 2 at the time of the offset collision between the rear side members 1. The load position can be calculated based on the predetermined range St, and the distances La and Lb can be calculated from the load position. The maximum bending moment M may be calculated using the support reaction force Ra or Rb.

Next, in step S4, the proof stress PSs of the rear side members 1 and the proof stress PSb of the rear bumper reinforcement 2 are determined. The proof stress PSs is determined as the needed load Pd calculated in step S1, and the proof stress PSb is determined as the maximum bending moment M calculated in step S3.

Then, the vehicle body rear portion structure 50 is configured so as to have the proof stress determined by the proof stress determination method described above. That is, in the vehicle body rear portion structure 50 of this embodiment, the proof stress PSs of the rear side members 1 is set to be the needed load Pd (for example, about 180 kN), and the proof stress PSb of the rear bumper reinforcement 2 is set to be the maximum bending moment M (for example, about 20 kNm). In this way, the rear side members 1 and the rear bumper reinforcement 2 are not deformed before the region Ft (refer to FIG. 3) of the honeycomb body 153 is completely crushed at the time of the offset collision.

Figure 5:
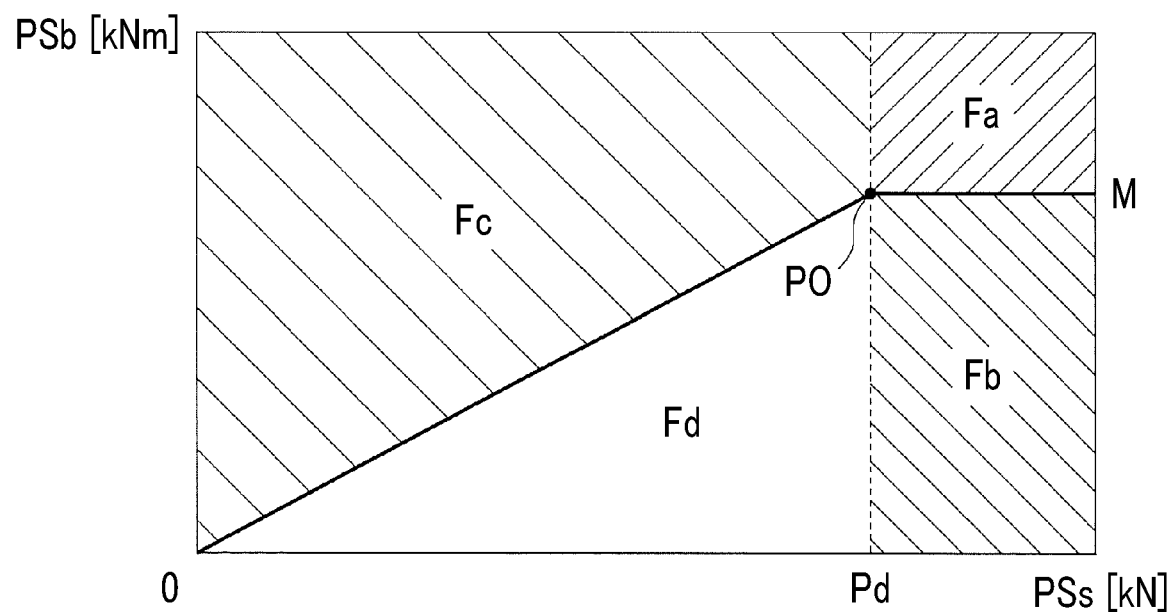
FIG. 5 is a graph showing a relationship between proof stress of a pair of rear side members and proof stress of the rear bumper reinforcement.

Relationship of Proof Stress Between Rear Side Member and Rear Bumper Reinforcement Next, the relationship between the proof stress PSs of the rear side members 1 and the proof stress PSb of the rear bumper reinforcement 2 will be described with reference to FIG. 5.

In the case of a region Fa in which the proof stress PSs is equal to or greater than the needed load Pd and the proof stress PSb is equal to or greater than the maximum bending moment M, the rear side member 1 and the rear bumper reinforcement 2 are not deformed until the region Ft of the honeycomb body 153 is completely crushed. That is, when the proof stress PSs and the proof stress PSb are set to be in the region Fa, the amount of collision energy that is absorbed by the honeycomb body 153 becomes large, and thus it is possible to suppress the deformation of the cabin.

On the other hand, when the proof stress PSs and the proof stress PSb are increased, there is a case where the mass of the rear side member 1 and the mass of the rear bumper reinforcement 2 increase. Therefore, in the case of a position PO where the proof stress PSs is the needed load Pd and the proof stress PSb is the maximum bending moment M, it is possible to reduce the mass of the rear side member 1 and the mass of the rear bumper reinforcement 2 while maintaining the proof stresses PSs and PSb in which it is possible to completely crush the honeycomb body 153.

In the case of a region Fb where the proof stress PSs is equal to or greater than the needed load Pd and the proof stress PSb is less than the maximum bending moment M, the rear bumper reinforcement 2 is deformed before the region Ft of the honeycomb body 153 is completely crushed. When the rear bumper reinforcement 2 is deformed, the rear side member 1 is not deformed.

In the cases of regions Fc and Fd where the proof stress PSs is less than the needed load Pd, the rear side member 1 is deformed before the region Ft of the honeycomb body 153 is completely crushed. In the case of the region Fc, the rear bumper reinforcement 2 is not deformed when the rear side member 1 is deformed. On the other hand, in the case of the region Fd, the rear bumper reinforcement 2 is deformed before the rear side member 1 is deformed. The boundary line between the region Fc and the region Fd is derived by calculating the maximum bending moment, based on the input load to the rear bumper reinforcement 2 according to the proof stress PSs of the rear side members 1.

Example of Operation at Offset Collision with Vehicle Rear Surface

Next, an example of an operation in a case where an offset-collision of the MDB 150 with the vehicle body rear portion structure 50 occurs, according to this embodiment will be described with reference to FIG. 1 and FIG. 6.

As shown in FIG. 1, in the offset collision, the overlapping amount of the MDB 150 with respect to the vehicle rear surface 100a is set to be, for example, 70%. In the offset collision, the MDB 150 is disposed on the first side (the Y1 direction side) in the vehicle width direction with respect to the vehicle 100.

Figure 6:
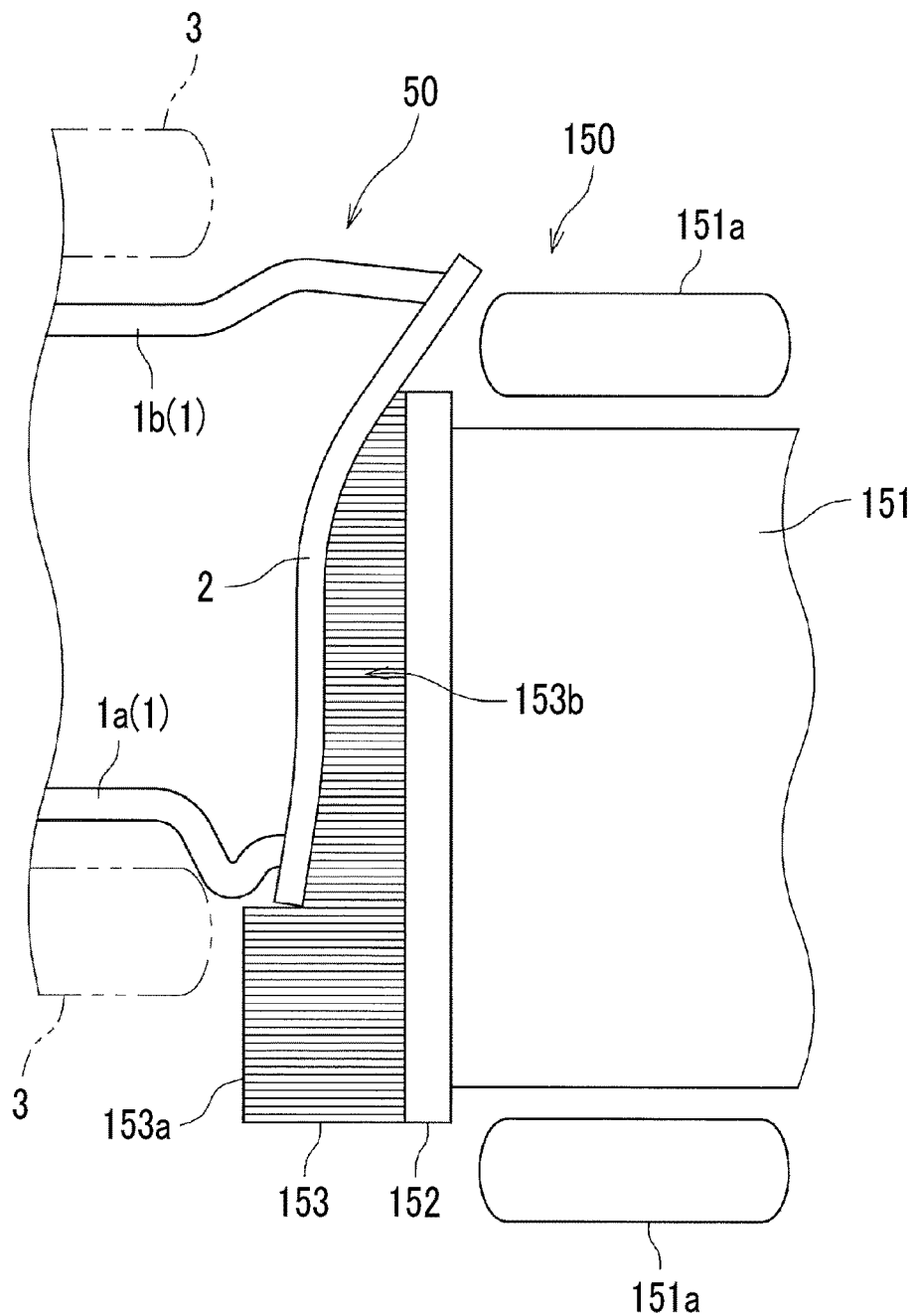
FIG. 6 is a diagram for describing an example of an operation in a case where an offset-collision of the MDB with the vehicle body rear portion structure occurs, according to the embodiment.
Figure 6:
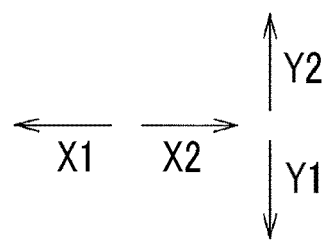

Then, in a case where the MDB 150 is moved toward the vehicle 100 side (the X1 direction side) and the offset-collision of the MDB 150 with the vehicle body rear portion structure 50 occurs, as shown in FIG. 6, the region Ft (refer to FIG. 3) of the honeycomb body 153 is completely crushed by the rear bumper reinforcement 2 that is supported by the rear side members 1. A crushed remaining portion 153b is formed between the rear bumper reinforcement 2 and the rigid wall portion 152. In this embodiment, since the proof stress PSs of the rear side members 1 is the needed load Pd and the proof stress PSb of the rear bumper reinforcement 2 is the maximum bending moment M, the rear side members 1 and the rear bumper reinforcement 2 are not deformed before the region Ft of the honeycomb body 153 is completely crushed.

Thereafter, when the input load to the rear bumper reinforcement 2 exceeds the proof stress PSb, the rear bumper reinforcement 2 is deformed, and when the input load to the rear side member 1a on the first side exceeds the proof stress, the rear side member 1a on the first side is deformed. At this time, since the region Ft of the honeycomb body 153 is completely crushed, deformation (bending) of the rear bumper reinforcement 2 is suppressed. In this way, since the end portion on the second side in the vehicle width direction (the Y2 direction side) of the rear bumper reinforcement 2 is restrained from being drawn inward, a decrease in the collision load that is transmitted to the rear side member 1b on the second side can be suppressed. That is, since the collision load can continue to be transmitted from the rear bumper reinforcement 2 to the rear side member 1b on the second side, the deformation of the cabin can be further suppressed.

Effects

In this embodiment, as described above, the proof stress PSs of the rear side members 1 is set to be the needed load Pd and the proof stress PSb of the rear bumper reinforcement 2 is set to be the maximum bending moment M. With the configuration as described above, at the time of the offset collision, it is possible to restrain the rear side members 1 and the rear bumper reinforcement 2 from being deformed before the region Ft of the honeycomb body 153 is completely crushed. That is, in a case where the rear side members 1 and the rear bumper reinforcement 2 are deformed at the time of the offset collision, the region Ft of the honeycomb body 153 is completely crushed before the above-described deformation. In this way, at the time of the offset collision, the amount of collision energy that is absorbed by the honeycomb body 153 can be increased, and therefore, it is possible to suppress the deformation of the cabin. Further, it is possible to reduce the mass of the rear side member 1 and the mass of the rear bumper reinforcement 2 while maintaining the proof stresses PSs and PSb in which it is possible to completely crush the region Ft of the honeycomb body 153.

Other Embodiments

The embodiment disclosed here is exemplification in all respects and is not a basis for a limited interpretation. Therefore, the technical scope of the present disclosure is not to be interpreted solely by the above-described embodiment and is defined based on the statement of the claims. Further, all changes within the meaning and the scope equivalent to the claims are included in the technical scope of the present disclosure.

For example, in the above-described embodiment, an example in which the present disclosure is applied to the vehicle body rear portion structure 50 is shown. However, there is no limitation thereto, and the present disclosure may be applied to a vehicle body front portion structure.

In the above-described embodiment, an example in which the needed load Pd that is input from the honeycomb body 153 to the rear bumper reinforcement 2 is calculated as a concentrated load is shown. However, there is no limitation thereto, and the needed load that is input from the honeycomb body to the rear bumper reinforcement may be calculated as a uniformly distributed load.

In step S4 of the above-described embodiment, an example in which the proof stress PSs of the rear side members 1 is determined as the needed load Pd and the proof stress PSb of the rear bumper reinforcement 2 is determined as the maximum bending moment M is shown. However, there is no limitation thereto, and a configuration may be made such that the proof stress of the rear side members is determined to be equal to or greater than the needed load and the proof stress of the rear bumper reinforcement is determined to be equal to or greater than the maximum bending moment. Even with the configuration as described above, since the honeycomb body can be completely crushed, it is possible to suppress the deformation of the cabin.

In step S1 of the above-described embodiment, the needed load Pd may be calculated in consideration of a safety factor. In this case, for example, the needed load Pd is calculated by the following expression (5). SF1 in the expression (5) is a safety factor and is a value (for example, 1.2) set in advance. With the configuration as described above, even though variation (variation between the area At at the design stage and the area of the honeycomb body 153 to be brought into contact with the rear bumper reinforcement 2 at the time of an actual offset collision) occurs in the area of the honeycomb body 153 to be brought into contact with the rear bumper reinforcement 2 at the time of the offset collision, it is possible to restrain the rear side member 1 from being deformed before the honeycomb body 153 is completely crushed.

$$Pd = Pw \times (At/Aw) \times SF1 \qquad (5)$$

In step S3 of the above-described embodiment, the maximum bending moment M may be calculated in consideration of a safety factor. In this case, for example, the maximum bending moment M is calculated by the following expression (6). SF2 in the expression (6) is a safety factor and is a value (for example, 1.2) set in advance. With the configuration as described above, even though variation (variation between the needed load Pd and the load position at the design stage and the needed load and the load position at the time of an actual offset collision) occurs in the needed load that is input at the time of the offset collision or the load position, it is possible to restrain the rear bumper reinforcement 2 from being deformed before the honeycomb body 153 is completely crushed.

$$M = Pd \times (La \times Lb/L) \times SF2 \qquad (6)$$

In the above-described embodiment, an example in which the support reaction forces Ra and Rb are calculated in step S2 is shown. However, there is no limitation thereto, and step S2 may be omitted.

The present disclosure can be applied to a proof stress determination method for determining the proof stress of a pair of side members and a bumper reinforcement in a vehicle body structure which includes the side members and the bumper reinforcement, and a vehicle body structure which includes a pair of side members and a bumper reinforcement having the proof stress determined by the proof stress determination method.

What is claimed is:
1. A method of determining a design parameter of a pair of side members and a design parameter of a bumper reinforcement in a vehicle body structure that includes the side members and the bumper reinforcement, the method comprising:
   measuring a first load needed to completely crush an entire front surface of a deformable impact absorption body of a barrier;
   measuring a first area of the entire front surface of the impact absorption body, which comes into contact with the bumper reinforcement at the time of an offset collision;
   calculating a second load needed to completely crush a portion of the deformable impact absorption body of the barrier corresponding to the area by multiplying the first load by the area, and dividing by an area of the entire front surface of the impact absorption body;
   calculating a maximum bending moment acting on the bumper reinforcement in a case where the second load is input at the time of the offset collision, wherein the maximum bending moment is the second load multiplied by a distance from one of the side members on the first side to a position of the second load multiplied by a distance from one of side member on the second side to the position of the second load and divided by a distance between the side members; and
   determining the design parameter of the side members to be equal to or greater than the second load and determining the design parameter of the bumper reinforcement to be equal to or greater than the maximum bending moment.

2. The method according to claim 1, wherein:
   the design parameter of the side members is the second load; and
   the design parameter of the bumper reinforcement is the maximum bending moment.

3. The method according to claim 1, wherein:
the side member is a rear side member; and
the bumper reinforcement is a rear bumper reinforcement.

4. The method according to claim 1, wherein the second load is calculated with a safety factor.

5. The method according to claim 1, wherein the maximum bending moment is calculated with a safety factor.

* * * * *